(12) United States Patent
Xuan et al.

(10) Patent No.: US 11,320,353 B2
(45) Date of Patent: May 3, 2022

(54) CREEP STRENGTH ANALYSIS AND ASSESSMENT METHOD AND COMPUTER DEVICE

(71) Applicant: East China University of Science and Technology, Shanghai (CN)

(72) Inventors: Fuzhen Xuan, Shanghai (CN); Tianye Niu, Shanghai (CN); Jianguo Gong, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 0 days.

(21) Appl. No.: 17/286,567

(22) PCT Filed: Oct. 10, 2019

(86) PCT No.: PCT/CN2019/110284
§ 371 (c)(1),
(2) Date: Apr. 19, 2021

(87) PCT Pub. No.: WO2021/068148
PCT Pub. Date: Apr. 15, 2021

(65) Prior Publication Data
US 2021/0341365 A1 Nov. 4, 2021

(51) Int. Cl.
*G01N 3/18* (2006.01)
*G01N 3/24* (2006.01)
*G01N 25/72* (2006.01)

(52) U.S. Cl.
CPC .......... *G01N 3/18* (2013.01); *G01N 3/24* (2013.01); *G01N 25/72* (2013.01); *G01N 2203/0071* (2013.01); *G01N 2203/0226* (2013.01)

(58) Field of Classification Search
CPC ... G01N 3/00; G01N 3/28; G01N 3/08; G06F 17/50; G06F 30/23; G06F 119/14; G01M 15/14
See application file for complete search history.

(56) References Cited

U.S. PATENT DOCUMENTS

| 10,295,456 B2 * | 5/2019 | Nishida ............... G01N 3/08 |
| 2014/0092934 A1 * | 4/2014 | Isobe ............. G01N 33/2045 374/4 |

(Continued)

FOREIGN PATENT DOCUMENTS

| CN | 104316388 A | 1/2015 |
| CN | 106484936 A | 3/2017 |
| CN | 106557630 A | 4/2017 |

OTHER PUBLICATIONS

China Academic Journal Electronic Publishing House, Comparison and Case Analysis of Stress-based Creep Design Criteria for High Temperature Structures, dated Apr. 15, 2019, ISSN: 1001-4837.

(Continued)

*Primary Examiner* — Brandi N Hopkins
(74) *Attorney, Agent, or Firm* — Marshall & Melhorn, LLC

(57) ABSTRACT

A creep strength analysis and assessment method includes comparing whether a maximum value of a local strain and a membrane strain are less than a corresponding allowable strain, and if less, determining that a component is safe; otherwise, performing the following steps: performing stress linearization on a path to obtain a local primary membrane stress $P_L$ and a local primary bending stress $P_b$; averaging shear stress components on the path to obtain an average shear stress $\tau_m$; obtaining a strength limit $S_{mt}$, a time-independent minimum stress strength value $S_m$ and a temperature- and time-dependent stress strength limit $S_t$ for a given material, a design lifetime and a design temperature;

(Continued)

comparing whether $P_L$, $P_L+P_b$ and $P_L+P_b/K_t$ are less than $S_{mt}$, $KS_m$ and $S_t$; and comparing whether $\tau_m$ is less than $0.6S_m$ and $0.6S_t$, and if less, the component is safe, otherwise, the component is unsafe.

7 Claims, 2 Drawing Sheets

(56)  References Cited

U.S. PATENT DOCUMENTS

2014/0379280 A1* 12/2014 Arai ..................... G01N 3/40
702/34
2015/0168262 A1   6/2015 Green et al.

OTHER PUBLICATIONS

China National Intellectual Property Administration, International Search Report and Written Opinion in application No. PCT/CN2019/110284, dated Mar. 6, 2020, 12 pages.

\* cited by examiner

CREEP STRENGTH ANALYSIS AND ASSESSMENT METHOD AND COMPUTER DEVICE

TECHNICAL FIELD

The present invention belongs to the field of creep strength evaluation and assessment for high-temperature structure or components, and specifically relates to a creep strength analysis and assessment method for a discontinuous part of a high-temperature structure or component and a computer device.

BACKGROUND ART

As there is an urgent need in the nation for energy saving, consumption reduction, and environmental protection, the development of a new generation advanced ultra-supercritical steam turbine unit technology has become an important task faced by thermal power, nuclear power and other industries in China. In advanced energy equipment, a large number of engineering components face extreme operation conditions such as a high temperature and a high pressure. For example, for a new generation ultra-supercritical power station, an inlet steam temperature is up to 700° C., and a steam pressure reaches 37.5 MPa. Therefore, a creep failure caused by the high temperature and the high pressure is a failure mode that needs great attention in structural design and safety evaluation of a steam turbine rotor component.

At present, creep strength evaluation of a high-temperature component is mainly performed using a strength analysis and assessment method based on a single parameter, i.e. a strength evaluation strategy based only on a strain or a stress. From the perspective of strain, the former restricts the accumulative deformation of the component not to be too great. From the perspective of stress, the latter restricts the stress level of the component not to be too high.

For the strain-based creep strength evaluation strategy, in order to describe the multiaxial stress state of the high-temperature component, multiaxial stress correction coefficients (such as the Cocks-Ashby model and the Hu-Xuan model) usually need to be introduced. This often leads to over conservative estimation under high stress triaxiality, and consequently, creep strength assessment hardly succeeds. The essence of this strategy is to avoid large creep deformation in the high-temperature component (especially in a locally discontinuous region). However, the service potential of the structure cannot be fully exploited by only conservatively restricting creep strain accumulation. Considering that the creep failure is a time-dependent destructive failure, if the strength design is performed based on rupture prevention and control (based on stress), the service potential of the material can be fully exerted, and the conservatism of the structural design can be further reduced.

For the stress-based creep strength evaluation strategy, a stress classification method is mainly used to restrict a membrane stress and a bending stress. Failure cases of engineering members indicate that a shear stress may play an important role in the rupture failure of discontinuous parts of high-temperature structures or components. Taking a vane root region of a steam turbine rotor as an example, the failure of this structure is caused by a contact region between the rotor and a vane, and is a typical shear stress failure. In order to guarantee the creep strength of the structure, it is necessary to introduce a stress criterion based on a shear stress, thereby further ensuring the safety of the high-temperature structure or component.

In conclusion, the current high-temperature component creep strength evaluation method is usually based only on a single mechanical variable (e.g. a stress or a strain), there is an urgent need to form a creep strength evaluation procedure for a discontinuous part of a high-temperature structure or component based on two criteria: strain and stress. For an over conservative design result caused by only restricting a strain cumulant, a strength assessment strategy based on a combination of strain and stress is established, so as to reduce the conservatism of the strain design. In view of the problem that a shear stress failure mode is not considered in the existing stress evaluation strategy, a creep strength evaluation strategy incorporating a shear stress is to be built.

SUMMARY OF THE INVENTION

The present invention provides a creep strength analysis and assessment method for a high-temperature structure or component based on two criteria: stress and strain, and a computer device.

A creep strength analysis and assessment method comprises the steps of:

$S_1$, acquiring design condition parameters, the parameters comprising a design temperature T, a design load P, a design lifetime t, and a specific material and structural size of a high-temperature structure or component;

$S_2$, obtaining parameters of the material according to the material and the design temperature T in step $S_1$, the parameters comprising the Norton-Bailey constitutive equation, an elastic modulus E, a Poisson's ratio $\mu$ and a stress-strain relationship curve;

$S_3$, calculating a maximum principal strain $\varepsilon_1$, a hydrostatic stress $\sigma_m$, an equivalent stress $\sigma_e$ and a shear stress $\tau$ corresponding to the time of the design lifetime t;

$S_4$, determining a multiaxial correction coefficient $F_{H-X}$ according to a stress exponent n in the Norton-Bailey constitutive equation in step $S_2$ and the hydrostatic stress $\sigma_m$ and the equivalent stress $\sigma_e$ calculated in step $S_3$;

$S_5$, calculating an equivalent creep strain $\varepsilon_{eq} = \varepsilon_1 F_{H-X}$ according to the maximum principal strain $\varepsilon_1$ in step $S_3$ and the multiaxial correction coefficient $F_{H-X}$ in step $S_4$, and determining a maximum value $\varepsilon_{eq,max}$ of a local strain according to the distribution of the equivalent creep strain;

$S_6$, selecting a path on a discontinuous part of the high-temperature structure or component to perform strain linearization, so as to determine a membrane strain $\varepsilon_m$;

$S_7$, determining an allowable strain, namely, an allowable value $[\varepsilon]_m$ of the membrane strain and an allowable value $[\varepsilon]_{eq}$ of the local strain;

$S_8$, comparing whether the maximum value $\varepsilon_{eq,max}$ of the local strain in step $S_5$ and the membrane strain $\varepsilon_m$ in step $S_6$ are less than the corresponding allowable strain in step $S_7$; wherein if both are less than the corresponding allowable strain in step $S_7$, the high-temperature structure or component is safe; otherwise, step $S_9$ is performed;

$S_9$, performing stress linearization on the path according to the distribution of the equivalent stress and the shear stress determined in step $S_3$, so as to obtain a local primary membrane stress $P_L$ and a local primary bending stress $P_b$; and averaging shear stress components on the path to obtain an average shear stress $\tau_m$;

$S_{10}$, obtaining a strength limit $S_{mt}$ of the primary membrane stress, a time-independent minimum stress strength value $S_m$ at a given temperature and a temperature- and time-dependent stress strength limit $S_t$ according to the material, the design lifetime t and the design temperature T given in step $S_1$; and $S_{11}$, according to the stresses $P_L$, $P_b$ and $\tau_m$ in step $S_9$, comparing whether calculated strength values $P_L$, $P_L+P_b$ and $P_L+P_b/K_t$ in stress classification are less than $S_{mt}$, $KS_m$ and $S_t$ respectively; and comparing whether the shear stress $\tau_m$ is less than $0.6S_m$ and $0.6S_t$; wherein if $P_L$, $P_L+P_b$ and $P_L+P_b/K_t$ in stress classification are less than $S_{mt}$, $KS_m$ and $S_t$ respectively and $\tau_m$ is less than $0.6S_m$ and $0.6S_t$, the high-temperature structure or component is safe; otherwise, the high-temperature structure or component is unsafe, wherein $K_t$ is a coefficient of primary bending stress attenuation caused by creep influence, and K is a section coefficient of a cross section in consideration.

In an implementation, in step $S_4$, the multiaxial correction coefficient $F_{H-X}$ is determined with a Hu-Xuan multiaxial creep correction model:

$$F_{H-X} = \begin{cases} 1.0 & \frac{\sigma_m}{\sigma_{eq}} < \frac{1}{3} \\ \min\left\{10, \cosh\left(2 \times \frac{n-0.5}{n+0.5} \times \frac{\sigma_m}{\sigma_{eq}}\right) - \cosh\left(\frac{2}{3} \times \frac{n-0.5}{n+0.5}\right) + 1\right\} & \frac{\sigma_m}{\sigma_{eq}} > \frac{1}{3} \end{cases}$$

In an implementation, in step $S_{11}$, for a rectangular section, $K_t=1.25$ and $K=1.5$.

In an implementation, in step $S_3$, stress and strain analysis and calculation are performed on the high-temperature structure or component based on a finite element method.

In an implementation, in step $S_2$, the Norton-Bailey constitutive equation is obtained through a high-temperature round rod tensile creep test; the elastic modulus E is obtained through a dynamic thermomechanical analyzer test; and the stress-strain relationship curve is obtained through a high-temperature round rod tensile test.

In an implementation, in step $S_6$, the selection of the path is determined based on comprehensive consideration of the calculated creep stress field, strain field and the structural size of the high-temperature structure or component.

A computer device, comprising a memory, a processor, and a computer program stored on the memory and capable of running on the processor, wherein when executing the program, the processor implements the steps of:

$S_1$, acquiring design condition parameters, the parameters comprising a design temperature T, a design load P, a design lifetime t, and a specific material and structural size of a high-temperature structure or component;

$S_2$, obtaining parameters of the material according to the material and the design temperature T in step $S_1$, the parameters comprising the Norton-Bailey constitutive equation, an elastic modulus E, a Poisson's ratio μ and a stress-strain relationship curve;

$S_3$, obtaining a maximum principal strain $\varepsilon_1$, a hydrostatic stress $\sigma_m$, an equivalent stress $\sigma_e$ and a shear stress $\tau$ corresponding to the time of the design lifetime t;

$S_4$, determining a multiaxial correction coefficient $F_{H-X}$ according to a stress exponent n in the Norton-Bailey constitutive equation in step $S_2$ and the hydrostatic stress $\sigma_m$ and the equivalent stress $\sigma_e$ obtained in step $S_3$;

$S_5$, calculating an equivalent creep strain $\varepsilon_{eq}=\varepsilon_1 F_{H-X}$ according to the maximum principal strain $\varepsilon_1$ in step $S_3$ and the multiaxial correction coefficient $F_{H-X}$ in step $S_4$, and determining a maximum value $\varepsilon_{eq,max}$ of a local strain according to the distribution of the equivalent creep strain;

$S_6$, acquiring a path on a discontinuous part of the high-temperature structure or component to perform strain linearization, so as to determine a membrane strain $\varepsilon_m$;

$S_7$, acquiring an allowable strain, namely, an allowable value $[\varepsilon]_m$ of the membrane strain and an allowable value $[\varepsilon]_{eq}$ of the local strain;

$S_8$, comparing whether the maximum value $\varepsilon_{eq,max}$ of the local strain in step $S_5$ and the membrane strain $\varepsilon_m$ in step $S_6$ are less than the corresponding allowable strain in step $S_7$; wherein if both are less than the corresponding allowable strain in step $S_7$, the high-temperature structure or component is safe; otherwise, step $S_9$ is performed;

$S_9$, performing stress linearization on the path according to the distribution of the equivalent stress and the shear stress determined in step $S_3$, so as to obtain a local primary membrane stress $P_L$ and a local primary bending stress $P_b$; and averaging shear stress components on the path to obtain an average shear stress $\tau_m$;

$S_{10}$, obtaining a strength limit $S_{mt}$ of the primary membrane stress, a time-independent minimum stress strength value $S_m$ at a given temperature and a temperature- and time-dependent stress strength limit $S_t$ according to the material, the design lifetime t and the design temperature T given in step $S_1$; and $S_{11}$, according to the stresses $P_L$, $P_b$ and $\tau_m$ in step $S_9$, comparing whether calculated strength values $P_L$, $P_L+P_b$ and $P_L+P_b/K_t$ in stress classification are less than $S_{mt}$, $KS_m$ and $S_t$ respectively; and comparing whether the shear stress $\tau_m$ is less than $0.6S_m$ and $0.6S_t$; wherein if $P_L$, $P_L+P_b$ and $P_L+P_b/K_t$ in stress classification are less than $S_{mt}$, $KS_m$ and $S_t$ respectively and $\tau_m$ is less than $0.6S_m$ and $0.6S_t$, the high-temperature structure or component is safe; otherwise, the high-temperature structure or component is unsafe, wherein $K_t$ is a coefficient of primary bending stress attenuation caused by creep influence, and K is a section coefficient of a cross section in consideration.

Beneficial Effects the present invention provides a creep strength analysis and assessment method and dedicated analysis procedure for a discontinuous part of a high-temperature structure or component based on two criteria: stress and strain, which significantly reduces the excessively high conservatism of a result based only on strain evaluation during creep strain evaluation; and introduction of a stress criterion based on a shear stress during stress evaluation further ensures the safety of a high-temperature structure. In conclusion, the evaluation method based on the two criteria: stress and strain significantly improves the service potential of the structure.

BRIEF DESCRIPTION OF THE DRAWINGS

The drawings are used to provide a further understanding of the present invention, and they only constitute a part of this specification to further explain the invention, and do not constitute a limitation to the present invention.

DETAILED DESCRIPTION OF EMBODIMENTS

Figure 1:
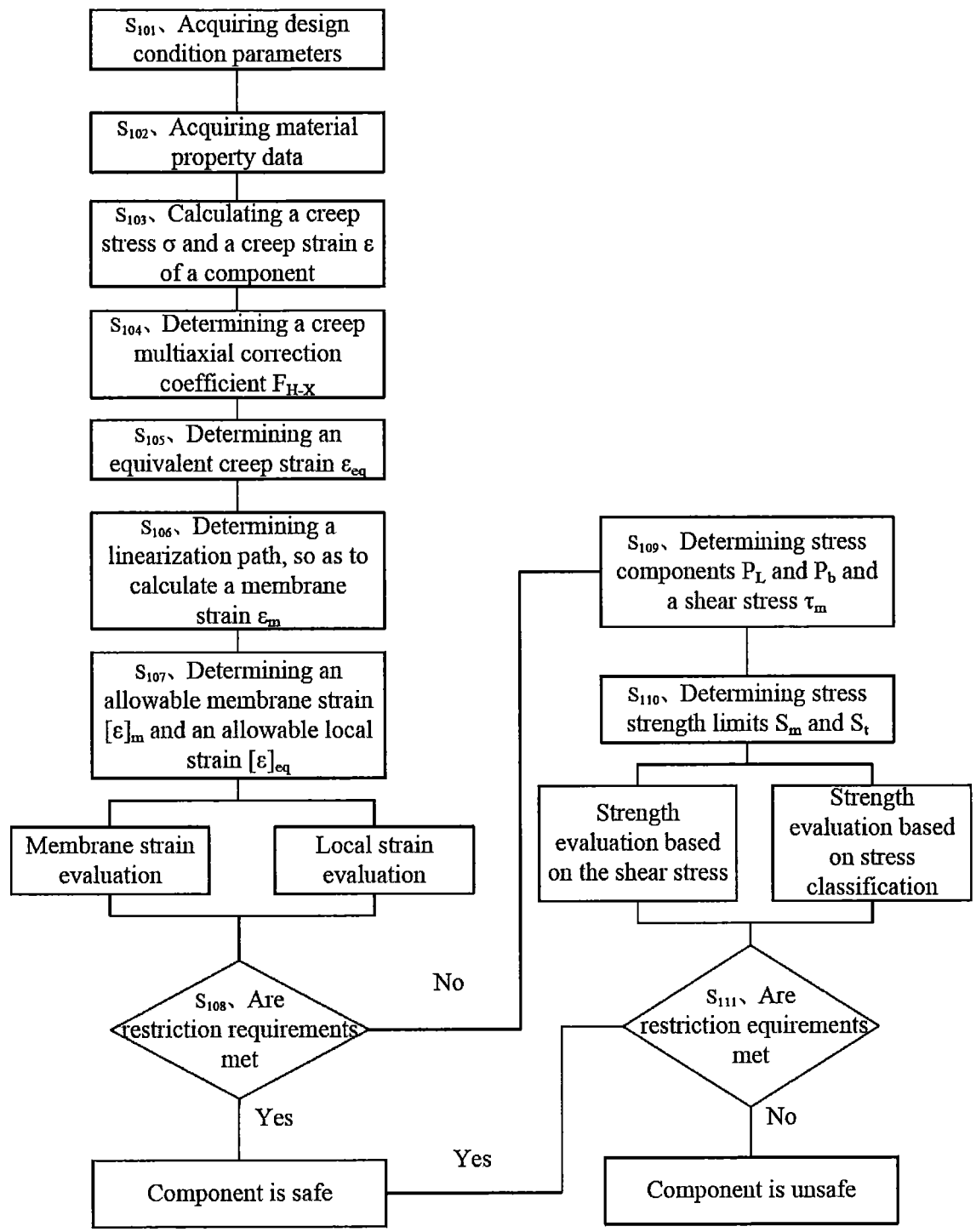
FIG. 1 is a flowchart according to a preferred implementation of the present invention.

The present invention provides a creep strength analysis and assessment method for a discontinuous part of a high-temperature structure or component based on two criteria, the method comprising the steps of:

$S_1$, acquiring design condition parameters, the parameters comprising a design temperature T, a design load P, a design lifetime t, and a specific material and structural size of a high-temperature structure or component;

$S_2$, obtaining parameters of the material according to the material and the design temperature T in step $S_1$, the parameters comprising the Norton-Bailey constitutive equation $\dot{\varepsilon}=A\sigma^n t^m$, wherein in the equation, $\dot{\varepsilon}$ is a strain rate, $\sigma$ is a stress, A is a material parameter, n is a stress exponent, and m is a time exponent; and an elastic modulus E, a Poisson's ratio $\mu$, and a stress-strain relationship curve;

$S_3$, performing creep stress and strain analysis and calculation on the high-temperature structure or component, wherein the calculation method may be a finite element method, so as to calculate a maximum principal strain $\varepsilon_1$, a hydrostatic stress $\sigma_m$, an equivalent stress $\sigma_e$ and a shear stress $\tau$ corresponding to the time of the design lifetime t;

$S_4$, determining a multiaxial correction coefficient $F_{H-X}$ according to the stress exponent n in step $S_2$ and the hydrostatic stress $\sigma_m$ and the equivalent stress $\sigma_e$ calculated in step $S_3$ (taking a Hu-Xuan multiaxial creep correction model as an example, but not restricted thereto);

$$F_{H-X} = \begin{cases} 1.0 & \frac{\sigma_m}{\sigma_{eq}} < \frac{1}{3} \\ \min\left\{10, \cosh\left(2\times\frac{n-0.5}{n+0.5}\times\frac{\sigma_m}{\sigma_{eq}}\right)-\cosh\left(\frac{2}{3}\times\frac{n-0.5}{n+0.5}\right)+1\right\} & \frac{\sigma_m}{\sigma_{eq}} > \frac{1}{3} \end{cases}$$

$S_5$, calculating an equivalent creep strain $\varepsilon_{eq}=\varepsilon_1 F_{H-X}$ according to the maximum principal strain $\varepsilon_1$ in step $S_3$ and the multiaxial correction coefficient $F_{H-X}$ in step $S_4$; and determining a maximum value $\varepsilon_{eq,max}$ of a local strain according to the distribution of the equivalent creep strain;

$S_6$, selecting a path on the discontinuous part of the high-temperature structure or component to perform strain linearization, wherein the method for performing the strain linearization is: selecting the path, extracting strain components ($\varepsilon_x$, $\varepsilon_y$, $\varepsilon_z$, $\varepsilon_{xy}$, $\varepsilon_{xz}$, $\varepsilon_{yz}$) of each node on the path, calculating an average strain of the components, and then calculating a corresponding maximum principal strain, so as to obtain a membrane strain $\varepsilon_m$ according to the strain linearization;

$S_7$, determining an allowable strain: an allowable value $[\varepsilon]_m$ of the membrane strain and an allowable value $[\varepsilon]_{eq}$ of the local strain, wherein the allowable values $[\varepsilon]_m$ and $[\varepsilon]_{eq}$ may be determined by querying a design manual;

$S_8$, comparing whether the maximum value $\varepsilon_{eq,max}$ of the local strain in step $S_5$ and the membrane strain $\varepsilon_m$ in step $S_6$ are less than the corresponding allowable strain in step $S_7$; wherein if both are less than the corresponding allowable strain in step $S_7$, the high-temperature structure or component is safe; otherwise, step $S_9$ is performed;

$S_9$, performing, according to the distribution of the equivalent stress and the shear stress determined in step $S_3$, stress linearization on the linearization path to be assessed, so as to obtain different stress components: a local primary membrane stress $P_L$ and a local primary bending stress $P_b$; and averaging shear stress components on the path to be assessed to obtain an average shear stress $\tau_m$;

$S_{10}$, obtaining an allowed strength limit $S_{mt}$ of the primary membrane stress, a time-independent minimum stress strength value $S_m$ at a given temperature and a temperature- and time-dependent stress strength limit $S_t$ according to the material, the design lifetime t and the design temperature T given in step $S_1$, wherein the stress strength values $S_{mt}$, $S_m$ and $S_t$ may be obtained by querying a material property database;

$S_{11}$, according to the stress components $P_L$ and $P_b$ and the shear stress $\tau_m$ in step $S_9$, comparing whether calculated strength values $P_L$, $P_L+P_b$ and $P_L+P_b/K_t$ in stress classification are less than $S_{mt}$, $KS_m$ and $S_t$ respectively (wherein $K_t$ is a coefficient of primary bending stress attenuation caused by creep influence, and K is a section coefficient of a cross section in consideration), for example, for an implementation that the high-temperature structure or component has a rectangular section, $K_t=1.25$ and $K=1.5$; and comparing whether the shear stress $\tau_m$ is less than $0.6S_m$ and $0.6S_t$; wherein if $P_L$, $P_L+P_b$ and $P_L+P_b/K_t$ in stress classification are less than $S_{mt}$, $KS_m$ and $S_t$ respectively and $\tau_m$ is less than $0.6S_m$ and $0.6S_t$, the high-temperature structure or component is safe; otherwise, the high-temperature structure or component is unsafe.

In an implementation, the material parameters in step $S_2$ are obtained by querying a material property database, and if a parameter is not found, the material parameters need to be obtained by performing a corresponding test.

In another implementation, in step $S_2$, the Norton constitutive equation is obtained through a high-temperature round rod tensile creep test; the elastic modulus E is obtained through a dynamic thermomechanical analyzer test; and the stress-strain relationship curve is obtained through a high-temperature round rod tensile test.

In another implementation, in step $S_6$, the selection of the linearization path is determined based on comprehensive consideration of the calculated creep stress field, strain field and the structural size of the high-temperature structure or component.

A computer device based on the method mentioned above comprises a memory, a processor, and a computer program stored on the memory and capable of running on the processor, wherein when executing the program, the processor implements the steps of:

$S_1$, acquiring design condition parameters, the parameters comprising a design temperature T, a design load P, a design lifetime t, and a specific material and structural size of a high-temperature structure or component;

$S_2$, obtaining parameters of the material according to the material and the design temperature T in step $S_1$, the parameters comprising the Norton-Bailey constitutive equation, an elastic modulus E, a Poisson's ratio $\mu$ and a stress-strain relationship curve;

$S_3$, obtaining a maximum principal strain $\varepsilon_1$, a hydrostatic stress $\sigma_m$, an equivalent stress $\sigma_e$ and a shear stress $\tau$ corresponding to the time of the design lifetime t;

$S_4$, determining a multiaxial correction coefficient $F_{H-X}$ according to a stress exponent n in the Norton-Bailey constitutive equation in step $S_2$ and the hydrostatic stress $\sigma_m$ and the equivalent stress $\sigma_e$ obtained in step $S_3$;

$S_5$, calculating an equivalent creep strain $\varepsilon_{eq}=\varepsilon_1 F_{H-X}$ according to the maximum principal strain $\varepsilon_1$ in step $S_3$ and the multiaxial correction coefficient $F_{H-X}$ in step $S_4$, and determining a maximum value $\varepsilon_{eq,max}$ of a local strain according to the distribution of the equivalent creep strain;

$S_6$, acquiring a path on a discontinuous part of the high-temperature structure or component to perform strain linearization, so as to determine a membrane strain $\varepsilon_m$;

$S_7$, acquiring an allowable strain, namely, an allowable value $[\varepsilon]_m$ of the membrane strain and an allowable value $[\varepsilon]_{eq}$ of the local strain;

$S_8$, comparing whether the maximum value $\varepsilon_{eq,max}$ of the local strain in step $S_5$ and the membrane strain $\varepsilon_m$ in step $S_6$ are less than the corresponding allowable strain in step $S_7$; wherein if both are less than the corresponding allowable strain in step $S_7$, the high-temperature structure or component is safe; otherwise, step $S_9$ is performed;

$S_9$, performing stress linearization on the path according to the distribution of the equivalent stress and the shear stress determined in step $S_3$, so as to obtain a local primary membrane stress $P_L$ and a local primary bending stress $P_b$; and averaging shear stress components on the path to obtain an average shear stress $\tau_m$;

$S_{10}$, obtaining a strength limit $S_{mt}$ of the primary membrane stress, a time-independent minimum stress strength value $S_m$ at a given temperature and a temperature- and time-dependent stress strength limit $S_t$ according to the material, the design lifetime t and the design temperature T given in step $S_1$; and $S_{11}$, according to the stresses $P_L$, $P_b$ and $\tau_m$ in step $S_9$, comparing whether calculated strength values $P_L$, $P_L+P_b$ and $P_L+P_b/K_t$ in stress classification are less than $S_{mt}$, $KS_m$ and $S_t$ respectively; and comparing whether the shear stress $\tau_m$ is less than $0.6S_m$ and $0.6S_t$; wherein if $P_L$, $P_L+P_b$ and $P_L+P_b/K_t$ in stress classification are less than $S_{mt}$, $KS_m$ and $S_t$ respectively and $\tau_m$ is less than $0.6S_m$ and $0.6S_t$, the high-temperature structure or component is safe; otherwise, the high-temperature structure or component is unsafe, wherein $K_t$ is a coefficient of primary bending stress attenuation caused by creep influence, and K is a section coefficient of a cross section in consideration.

The method for "acquiring" or "obtaining" which are used in the description of the computer device mentioned above is to receive input from outside or read storage data in the memory or invoke output of another program.

Figure 2:
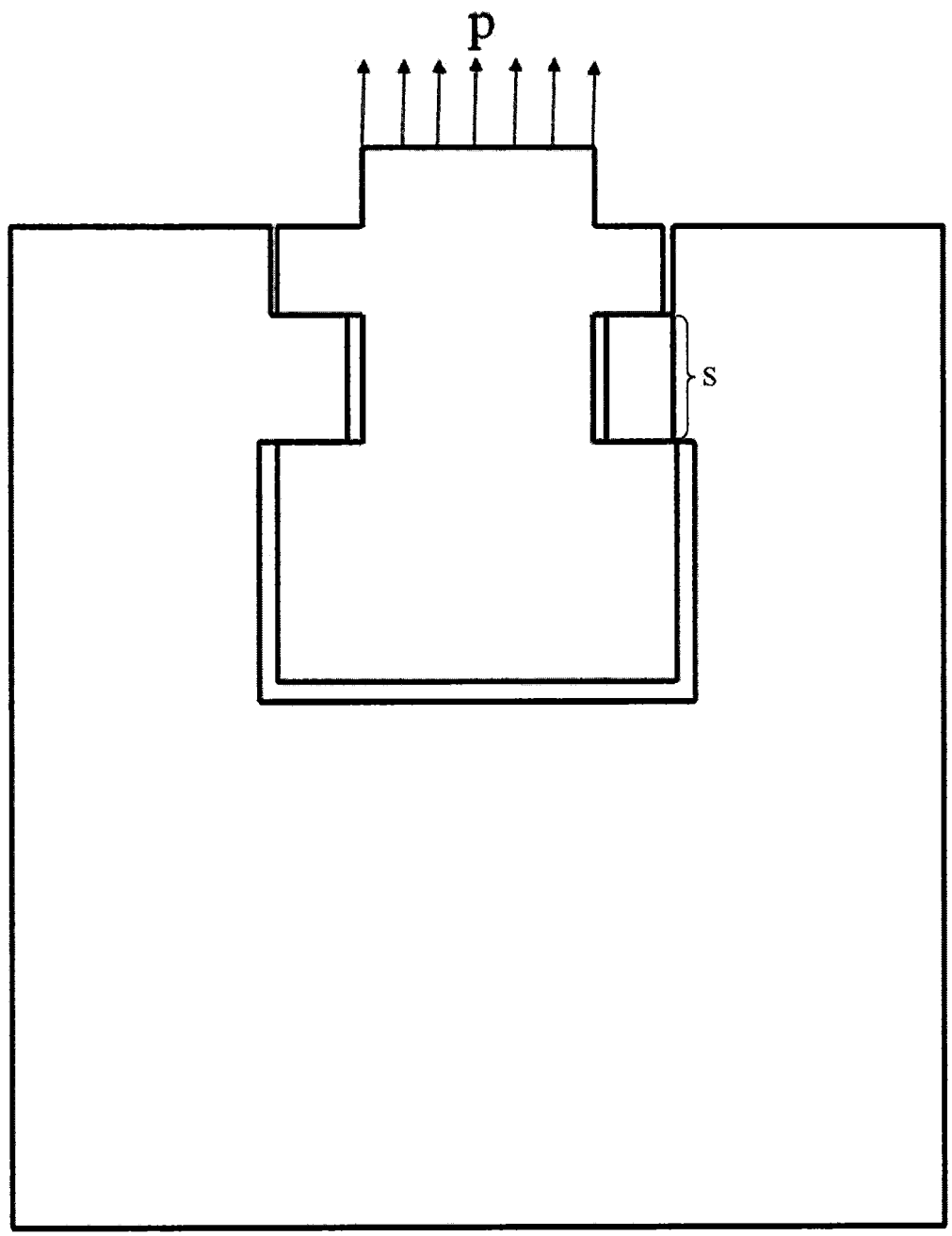
FIG. 2 is a schematic diagram of the shape and a linearization path of a rotor component according to a preferred implementation of the present invention.

With reference to FIG. 1 and FIG. 2, a calculation example according to the analysis and assessment method mentioned above is described.

FIG. 1 is a flowchart of a calculation example. As shown in FIG. 1, a creep strength analysis and assessment method and dedicated analysis procedure for a discontinuous part of a high-temperature structure or component based on two criteria: stress and strain comprise the steps of:

$S_{101}$, acquiring design condition parameters, wherein the design condition parameters are acquired according to a design temperature T, a design load P, a design lifetime t, and a specific material and structural size of a pressure receiving component;

$S_{102}$, acquiring material property data: the Norton constitutive equation (wherein a stress exponent is n), an elastic modulus E, a Poisson's ratio $\mu$ and a stress-strain relationship curve;

$S_{103}$, calculating a creep stress $\sigma$ and a creep strain $\varepsilon$ of the component corresponding to the time of the design lifetime t, wherein creep stress and strain analysis are performed on the pressure receiving component based on a finite element method, so as to calculate a maximum principal strain $\varepsilon_1$, a hydrostatic stress $\sigma_m$, an equivalent stress $\sigma_e$ and a shear stress $\tau$ corresponding to the time of the design lifetime t;

$S_{104}$, determining a creep multiaxial correction coefficient $F_{H-X}$, wherein the multiaxial correction coefficient $F_{H-X}$ is determined according to the stress exponent n in step $S_{102}$ and the hydrostatic stress $\sigma_m$ and the equivalent stress $\sigma_e$ calculated in step $S_{103}$;

$$F_{H-X} = \begin{cases} 1.0 & \frac{\sigma_m}{\sigma_{eq}} < \frac{1}{3} \\ \min\left\{10, \cosh\left(2 \times \frac{n-0.5}{n+0.5} \times \frac{\sigma_m}{\sigma_{eq}}\right) - \cosh\left(\frac{2}{3} \times \frac{n-0.5}{n+0.5}\right) + 1\right\} & \frac{\sigma_m}{\sigma_{eq}} > \frac{1}{3} \end{cases}$$

$S_{105}$, determining an equivalent creep strain $\varepsilon_{eq}$, wherein the equivalent creep strain $\varepsilon_{eq}=\varepsilon_1 F_{H-X}$ is calculated according to the maximum principal strain $\varepsilon_1$ in step $S_{103}$ and the multiaxial correction coefficient $F_{H-X}$ in step $S_{104}$; and determining a maximum value $\varepsilon_{eq,max}$ of a local strain according to the distribution of the equivalent creep strain;

$S_{106}$, determining a linearization path, so as to calculate a membrane strain $\varepsilon_m$, wherein the linearization path on the pressure receiving component is selected to perform strain linearization, so as to determine the membrane strain $\varepsilon_m$;

$S_{107}$, determining an allowable value $[\varepsilon]_m$ of the membrane strain and an allowable value $[\varepsilon]_{eq}$ of the local strain;

$S_{108}$, comparing whether the maximum value $\varepsilon_{eq,max}$ of the local strain in step $S_{105}$ and the membrane strain $\varepsilon_m$ in step $S_{106}$ are less than a corresponding allowable strain in step $S_{107}$; wherein if both are less than the corresponding allowable strain in step $S_{107}$, the pressure receiving component is safe; otherwise, step $S_{109}$ is performed;

$S_{109}$, determining stress components $P_L$ and $P_b$ and a shear stress $\tau_m$ on the path to be assessed, wherein stress linearization is performed, according to the distribution of the equivalent stress determined in step $S_{103}$, on the linearization path to be assessed, so as to obtain different stress components $P_L$ and $P_b$, and the shear stress $\tau_m$ on the path to be assessed is determined;

$S_{110}$, determining an allowed strength limit $S_{mt}$ of a primary membrane stress, a time-independent stress strength limit $S_m$ and a time-dependent stress strength limit $S_t$;

$S_{111}$, according to the stress components $P_L$ and $P_b$ and the shear stress $\tau_m$ in step $S_{109}$, comparing whether calculated strength values $P_L$, $P_L+P_b$ and $P_L+P_b/K_t$ in stress classification are less than $S_{mt}$, $KS_m$ and $S_t$ respectively; and comparing whether the shear stress $\tau_m$ is less than $0.6S_m$ and $0.6S_t$; wherein if $P_L$, $P_L+P_b$ and $P_L+P_b/K_t$ in stress classification are less than $S_{mt}$, $KS_m$ and $S_t$ respectively and $\tau_m$ is less than $0.6S_m$ and $0.6S_t$, the pressure receiving component is safe; otherwise, the pressure receiving component is unsafe.

Embodiments

High-temperature creep strength evaluation needs to be performed on a rotor component. For the rotor component, a design temperature is 600° C., a design load is 30.455 KN, a rotation angular speed applied to the rotor component is 314.15 rad/s, a design lifetime is 100,000 hours, a component material is 9-12% Cr, and a structure of the rotor component is shown in FIG. 2.

The process flow is as follows.

I. Acquiring design condition parameters. For the rotor component, the design temperature T is 600° C., the design load P is 30.455 KN, the rotation angular speed is 314.15 rad/s, the design lifetime t is 100,000 hours, the component material is 9-12% Cr steel, and the structure thereof is shown in FIG. 2 in which a selected path S is shown.

Chemical Compositions of the 9-12% Cr steel (mass fraction, %)

| C | Si | Mn | P | Cr | Ni |
|---|---|---|---|---|---|
| 0.11-0.13 | 0.05-0.08 | 0.42-0.54 | 0.008-0.01 | 9.4-10.4 | 0.15-0.8 |
| Mo | V | W | Ni | N | Nb |
| 1.0-1.51 | 0.18-0.2 | 1.03-1.49 | 0.15-0.8 | 0.02-0.05 | 0.04-0.05 |

II. Acquiring material property data. An elastic modulus E of 130.5 GPa and a Poisson's ratio μ of 0.3 at 600° C. are obtained through a static method test. A round bar tensile test is carried out at 600° C., to obtain, through the test, the 0.2% plastic elongation strength $R_{P0.2}$ being 145.5 MPa and the tensile strength $R_m$ being equal to 444.8 MPa. A high-temperature round rod tensile creep test is carried out at 600° C., to obtain a creep constitutive equation $$\dot{\varepsilon}_c = A_0 \sigma^n t^m.$$

III. Performing creep stress and strain analysis on the rotor component based on a finite element analysis and assessment method according to the geometric parameters and material property data of the component, so as to calculate a maximum principal strain $\varepsilon_1$, a hydrostatic stress $\sigma_m$, an equivalent stress $\sigma_e$ and a shear stress τ corresponding to the design lifetime of 100,000 hours.

IV. Determining a multiaxial correction coefficient $F_{H-X}$ according to a stress exponent n, the hydrostatic stress $\sigma_m$ and the equivalent stress $\sigma_e$.

$$F_{H-X} = \begin{cases} 1.0 & \frac{\sigma_m}{\sigma_{eq}} < \frac{1}{3} \\ \min\left\{10, \cosh\left(2 \times \frac{n-0.5}{n+0.5} \times \frac{\sigma_m}{\sigma_{eq}}\right) - \cosh\left(\frac{2}{3} \times \frac{n-0.5}{n+0.5}\right) + 1\right\} & \frac{\sigma_m}{\sigma_{eq}} > \frac{1}{3} \end{cases}$$

V. Calculating an equivalent creep strain $\varepsilon_{eq} = \varepsilon_1 F_{H-X}$ according to the maximum principal strain $\varepsilon_1$ and the multiaxial correction coefficient $F_{H-X}$; and determining, according to the distribution of the equivalent creep strain, a maximum value $\varepsilon_{eq,max}$ of a local strain being equal to 4.52%.

VI. Selecting a linearization path on the pressure receiving component to perform strain linearization, so as to determine a membrane strain $\varepsilon_m$ being equal to 2.06%. The linearization path is shown in the path S in FIG. 2.

VII. Determining an allowable value $[\varepsilon]_m$ of the membrane strain being equal to 1% and an allowable value $[\varepsilon]_{eq}$ of the local strain being equal to 5%.

VIII. Obviously, the membrane strain $\varepsilon_m$ is greater than the allowable value $[\varepsilon]_m$ of the membrane strain. Therefore, the ninth step of analysis is performed.

IX. Performing, according to the distribution of the calculated equivalent stress and the shear stress, stress linearization on the linearization path to be assessed, so as to obtain different stress components $P_L$ being equal to 55.1 MPa and $P_b$ being equal to 0 MPa; and determining the shear stress $\tau_m$ on the path to be assessed being equal to 26 MPa.

X. Determining an allowed strength limit $S_{mt}$ of a primary membrane stress being equal to 63.2 MPa, a time-independent stress strength limit $S_m$ being equal to 97.1 MPa and a time-dependent stress strength limit $S_t$ being equal to 63.2 MPa that corresponds to the design lifetime t being equal to 100,000 hours.

XI. Calculated strength value $P_L$=55.1 MPa, $P_L+P_b$=55.1 MPa and $P_L+P_b/K_t$=55.1 MPa in stress classification are less than corresponding $S_{mt}$ being equal to 63.2 MPa, $KS_m$ being equal to 145.7 MPa and $S_t$ being equal to 63.2 MPa; and the shear stress $\tau_m$ being equal to 26 MPa is less than both $0.6S_m$ being equal to 58.3 MPa and $0.6S_t$ being equal to 37.9 MPa. It indicates that the pressure receiving component is safe.

The embodiment listed above is only a preferred instance of the present invention, and not intended to limit the scope of implementation of the present invention. That is to say, all equivalent changes and modifications made based on the contents of the scope of patent application of the present invention should be within the technical scope of the present invention.

What is claimed is:

1. A creep strength analysis and assessment method, comprising the steps of:

$S_1$, acquiring design condition parameters, the parameters comprising a design temperature T, a design load P, a design lifetime t, and a specific material and structural size of a high-temperature structure or component;

$S_2$, obtaining parameters of the material according to the material and the design temperature T in step $S_1$, the parameters comprising the Norton-Bailey constitutive equation, an elastic modulus E, a Poisson's ratio μ and a stress-strain relationship curve;

$S_3$, calculating a maximum principal strain $\varepsilon_1$, a hydrostatic stress $\sigma_m$, an equivalent stress $\sigma_e$ and a shear stress τ corresponding to the design lifetime t;

$S_4$, determining a multiaxial correction coefficient $F_{H-X}$ according to a stress exponent n in the Norton-Bailey constitutive equation in step $S_2$ and the hydrostatic stress $\sigma_m$ and the equivalent stress $\sigma_e$ calculated in step $S_3$;

$S_5$, calculating an equivalent creep strain $\varepsilon_{eq} = \varepsilon_1 F_{H-X}$ according to the maximum principal strain $\varepsilon_1$ in step $S_3$ and the multiaxial correction coefficient $F_{H-X}$ in step $S_4$, and determining a maximum value $\varepsilon_{eq,max}$ of a local strain according to the distribution of the equivalent creep strain;

$S_6$, selecting a path on a discontinuous part of the high-temperature structure or component to perform strain linearization, so as to determine a membrane strain $\varepsilon_m$;

$S_7$, determining an allowable strain, namely, an allowable value $[\varepsilon]_m$ of the membrane strain and an allowable value $[\varepsilon]_{eq}$ of the local strain;

$S_8$, comparing whether the maximum value $\varepsilon_{eq,max}$ of the local strain in step $S_5$ and the membrane strain $\varepsilon_m$ in step $S_6$ are less than the corresponding allowable strain in step $S_7$; wherein if both ae less than the corresponding allowable strain in step $S_7$, the high-temperature structure or component is safe; otherwise, step $S_9$ is performed;

$S_9$, performing stress linearization on the path according to the distribution of the equivalent stress and the shear stress determined in step $S_3$, so as to obtain a local primary membrane stress $P_L$ and a local primary bending stress $P_b$, and averaging shear stress components on the path to obtain an average shear stress $\tau_m$;

$S_{10}$, obtaining a strength limit $S_{mt}$ of the primary membrane stress, a time-independent minimum stress strength value $S_m$ at a given temperature and a temperature- and time-dependent stress strength limit $S_t$ according to the material, the design lifetime t and the design temperature T given in step $S_1$; and $S_{11}$, according to the stresses $P_L$, $P_b$ and $\tau_m$ in step $S_9$, comparing whether calculated strength values $P_L$, $P_L+P_b$ and $P_L+P_b/K_t$ in stress classification are less than $S_{mt}$, $KS_m$ and $S_t$ respectively; and comparing whether the shear stress $\tau_m$ is less than $0.6S_m$ and $0.6S_t$; wherein if $P_L$, $P_L+P_b$ and $P_L+P_b/K_t$ in stress classification are less than $S_{mt}$, $KS_m$ and $S_t$ respectively and $\tau_m$ is less than $0.6S_m$ and $0.6S_t$, the high-temperature structure or component is safe; otherwise, the high-temperature structure or component is unsafe, wherein $K_t$ is a coefficient of primary bending stress attenuation caused by creep action, and K is a section coefficient of a cross section in consideration.

2. The creep strength analysis and assessment method of claim 1, wherein in step $S_4$, the multiaxial correction coefficient $F_{H-X}$ is determined with a Hu-Xuan multiaxial creep correction model:

$$F_{H-X} = \begin{cases} 1.0 & \dfrac{\sigma_m}{\sigma_{eq}} < \dfrac{1}{3} \\ \min\left\{10, \cosh\left(2 \times \dfrac{n-0.5}{n+0.5} \times \dfrac{\sigma_m}{\sigma_{eq}}\right) - \cosh\left(\dfrac{2}{3} \times \dfrac{n-0.5}{n+0.5}\right) + 1\right\} & \dfrac{\sigma_m}{\sigma_{eq}} > \dfrac{1}{3} \end{cases}.$$

3. The creep strength analysis and assessment method of claim 1, wherein in step $S_{11}$, for a rectangular section, $K_t=1.25$ and $K=1.5$.

4. The creep strength analysis and assessment method of claim 1, wherein in step $S_3$, stress and strain analysis and calculation are performed on the high-temperature structure or component based on a finite element method.

5. The method of claim 1, wherein in step $S_2$, the Norton-Bailey constitutive equation is obtained through a high-temperature round rod tensile creep test; the elastic modulus E is obtained through a dynamic thermomechanical analyzer test; and the stress-strain relationship curve is obtained through a high-temperature round rod tensile test.

6. The method of claim 1, wherein in step $S_6$, the selection of the path is determined based on comprehensive consideration of the calculated creep stress field, strain field and the structural size of the high-temperature structure or component.

7. A computer device, comprising a memory, a processor, and a computer program stored on the memory and capable of running on the processor, wherein when executing the program, the processor implements the steps of:

$S_1$, acquiring design condition parameters, the parameters comprising a design temperature T, a design load P, a design lifetime t, and a specific material and structural size of a high-temperature structure or component;

$S_2$, obtaining parameters of the material according to the material and the design temperature T in step $S_1$, the parameters comprising the Norton-Bailey constitutive equation, an elastic modulus E, a Poisson's ratio μ and a stress-strain relationship curve;

$S_3$, obtaining a maximum principal strain $\varepsilon_1$, a hydrostatic stress $\sigma_m$, an equivalent stress $\sigma_e$ and a shear stress T corresponding to the design lifetime t;

$S_4$, determining a multiaxial correction coefficient $F_{H-X}$ according to a stress exponent n in the Norton-Bailey constitutive equation in step $S_2$ and the hydrostatic stress $\sigma_m$ and the equivalent stress $\sigma_e$ obtained in step $S_3$;

$S_5$, calculating an equivalent creep strain $\varepsilon_{eq}=\varepsilon_1 F_{H-X}$ according to the maximum principal strain $\varepsilon_1$ in step $S_3$ and the multiaxial correction coefficient $F_{H-X}$ in step $S_4$, and determining a maximum value $\varepsilon_{eq,max}$ of a local strain according to the distribution of the equivalent creep strain;

$S_6$, acquiring a path on a discontinuous part of the high-temperature structure or component to perform strain linearization, so as to determine a membrane strain $\varepsilon_m$;

$S_7$, acquiring an allowable strain, namely, an allowable value $[\varepsilon]_m$ of the membrane strain and an allowable value $[\varepsilon]_{eq}$ of the local strain;

$S_8$, comparing whether the maximum value $\varepsilon_{eq,max}$ of the local strain in step $S_5$ and the membrane strain $\varepsilon_m$ in step $S_6$ are less than the corresponding allowable strain in step $S_7$; wherein if both are less than the corresponding allowable strain in step $S_7$, the high-temperature structure or component is safe; otherwise, step $S_9$ is performed;

$S_9$, performing stress linearization on the path according to the distribution of the equivalent stress and the shear stress determined in step $S_3$, so as to obtain a local primary membrane stress $P_L$ and a local primary bending stress $P_b$, and averaging shear stress components on the path to obtain an average shear stress $\tau_m$;

$S_{10}$, obtaining a strength limit $S_{mt}$ of the primary membrane stress, a time-independent minimum stress strength value $S_m$ at a given temperature and a temperature- and time-dependent stress strength limit $S_t$ according to the material, the design lifetime t and the design temperature T given in step $S_1$; and $S_{11}$, according to the stresses $P_L$, $P_b$ and $\tau_m$ in step $S_9$, comparing whether calculated strength values $P_L$, $P_L+P_b$ and $P_L+P_b/K_t$ in stress classification are less than $S_{mt}$, $KS_m$ and $S_t$ respectively; and comparing whether the shear stress $\tau_m$ is less than $0.6S_m$ and $0.6S_t$; wherein if $P_L$, $P_L+P_b$ and $P_L+P_b/K_t$ in stress classification are less than $S_{mt}$, $KS_m$ and $S_t$ respectively and $\tau_m$ is less than $0.6S_m$ and $0.6S_t$, the high-temperature structure or component is safe; otherwise, the high-temperature structure or component is unsafe, wherein $K_t$ is a coefficient of primary bending stress attenuation caused by creep action, and K is a section coefficient of a cross section in consideration.

\* \* \* \* \*